(12) United States Patent
Sprigg et al.

(10) Patent No.: US 10,348,804 B2
(45) Date of Patent: *Jul. 9, 2019

(54) SYSTEM TO AUTOMATICALLY PROCESS COMPONENTS ON A DEVICE

(71) Applicant: QUALCOMM Incorporated, San Diego, CA (US)

(72) Inventors: Stephen A. Sprigg, Poway, CA (US); Brian Minear, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/797,142

(22) Filed: Jul. 12, 2015

(65) Prior Publication Data

US 2015/0319218 A1    Nov. 5, 2015

Related U.S. Application Data

(63) Continuation of application No. 10/740,355, filed on Dec. 18, 2003, now Pat. No. 9,092,286.

(Continued)

(51) Int. Cl.
*G06F 9/445* (2018.01)
*G06F 9/44* (2018.01)
(Continued)

(52) U.S. Cl.
CPC ............ *H04L 67/06* (2013.01); *G06F 8/60* (2013.01); *G06F 8/65* (2013.01); *G06F 8/71* (2013.01); *G06F 8/61* (2013.01); *G06F 8/656* (2018.02)

(58) Field of Classification Search
CPC ..... G06F 8/61; G06F 8/65; G06F 8/67; G06F 8/71; G06F 8/60; G06F 8/656; G06F 9/45512; G06Q 30/02; H04L 67/06
See application file for complete search history.

(56) References Cited

U.S. PATENT DOCUMENTS

| 5,155,847 | A | 10/1992 | Kirouac et al. |
| 5,473,772 | A | 12/1995 | Halliwell et al. |

(Continued)

FOREIGN PATENT DOCUMENTS

| CN | 1288199 | 3/2001 |
| CN | 1937533 A | 3/2007 |

(Continued)

OTHER PUBLICATIONS

OMA "SyncML HTTP Binding," Approved version 1.2—Feb. 21, 2007, Open Mobile Alliance, OMA-TS-SyncML_HTTPBinding-V1_2-20070221-A, pp. 1-24.

(Continued)

*Primary Examiner* — Thuy Dao
(74) *Attorney, Agent, or Firm* — Muncy, Geissler, Olds & Lowe, P.C.

(57) ABSTRACT

System to automatically process components on a device. A method is provided for automatically processing components on a device. The method includes receiving a version identifier associated with an action list, determining that the version identifier is not equivalent to a stored version identifier, receiving the action list, parsing the action list to obtain a component identifier and an associated action, and performing the action on a component identified by the component identifier.

22 Claims, 5 Drawing Sheets

US 10,348,804 B2

Page 2

Related U.S. Application Data

(60) Provisional application No. 60/435,486, filed on Dec. 20, 2002, provisional application No. 60/435,828, filed on Dec. 20, 2002.

(51) Int. Cl.
*H04L 29/08* (2006.01)
*G06F 8/65* (2018.01)
*G06F 8/71* (2018.01)
*G06F 8/60* (2018.01)
*G06F 8/61* (2018.01)
*G06F 8/656* (2018.01)

(56) References Cited

U.S. PATENT DOCUMENTS

| | | | |
|---|---|---|---|
| 5,564,051 A | 10/1996 | Halliwell et al. | |
| 5,612,682 A | 3/1997 | Deluca et al. | |
| 5,761,618 A | 6/1998 | Lynch et al. | |
| 5,848,064 A | 12/1998 | Cowan | |
| 5,913,213 A | 6/1999 | Wikstrom et al. | |
| 5,920,821 A | 7/1999 | Seazholtz et al. | |
| 5,995,756 A | 11/1999 | Herrmann | |
| 6,003,030 A * | 12/1999 | Kenner | G06F 17/30781 |
| 6,006,034 A * | 12/1999 | Heath | G06F 8/65 717/170 |
| 6,009,274 A * | 12/1999 | Fletcher et al. | 717/173 |
| 6,023,620 A | 2/2000 | Hansson | |
| 6,031,830 A | 2/2000 | Cowan | |
| 6,061,683 A | 5/2000 | Alonso | |
| 6,074,434 A | 6/2000 | Cole et al. | |
| 6,128,489 A | 10/2000 | Seazholtz et al. | |
| 6,167,567 A | 12/2000 | Chiles et al. | |
| 6,199,204 B1 | 3/2001 | Donohue | |
| 6,269,456 B1 * | 7/2001 | Hodges | G06F 8/65 714/38.1 |
| 6,272,333 B1 | 8/2001 | Smith | |
| 6,272,677 B1 | 8/2001 | Lam et al. | |
| 6,308,061 B1 | 10/2001 | Criss et al. | |
| 6,314,565 B1 | 11/2001 | Kenner et al. | |
| 6,327,617 B1 | 12/2001 | Fawcett | |
| 6,360,366 B1 * | 3/2002 | Heath | G06F 8/65 709/201 |
| 6,389,423 B1 | 5/2002 | Sakakura | |
| 6,397,060 B1 | 5/2002 | Oikawa | |
| 6,418,554 B1 | 7/2002 | Delo et al. | |
| 6,493,871 B1 | 12/2002 | McGuire et al. | |
| 6,564,048 B1 | 5/2003 | Sugita | |
| 6,590,881 B1 | 7/2003 | Wallace et al. | |
| 6,636,872 B1 | 10/2003 | Heath et al. | |
| 6,643,506 B1 | 11/2003 | Criss et al. | |
| 6,687,901 B1 | 2/2004 | Imamatsu | |
| 6,735,625 B1 | 5/2004 | Ponna | |
| 6,735,766 B1 | 5/2004 | Chamberlain et al. | |
| 6,748,209 B2 | 6/2004 | Lipsit | |
| 6,754,894 B1 | 6/2004 | Costello et al. | |
| 6,789,255 B1 | 9/2004 | Pedrizetti et al. | |
| 6,807,415 B2 | 10/2004 | Sato | |
| 6,832,373 B2 * | 12/2004 | O'Neill | G06F 8/65 714/25 |
| 6,868,455 B1 | 3/2005 | Ariyama | |
| 6,877,037 B1 | 4/2005 | Adachi | |
| 6,909,898 B2 | 6/2005 | Mielke et al. | |
| 6,961,764 B2 | 11/2005 | Mizoguchi | |
| 6,966,060 B1 | 11/2005 | Young et al. | |
| 6,970,960 B1 | 11/2005 | Sarfati | |
| 7,080,371 B1 | 7/2006 | Arnaiz et al. | |
| 7,100,158 B2 * | 8/2006 | Nakane | G06F 8/65 717/168 |
| 7,127,712 B1 | 10/2006 | Noble et al. | |
| 7,140,013 B2 | 11/2006 | Te'eni et al. | |
| 7,149,508 B2 | 12/2006 | Herle | |
| 7,149,792 B1 | 12/2006 | Hansen et al. | |
| 7,194,258 B2 | 3/2007 | Okita et al. | |
| 7,243,163 B1 | 7/2007 | Friend et al. | |
| 7,281,245 B2 * | 10/2007 | Reynar | G06F 8/65 717/169 |
| 7,287,097 B1 | 10/2007 | Friend et al. | |
| 7,391,759 B2 | 6/2008 | Wallace et al. | |
| 7,415,706 B1 | 8/2008 | Raju et al. | |
| 7,440,902 B2 * | 10/2008 | Greenstein | G06Q 30/02 705/1.1 |
| 7,512,638 B2 | 3/2009 | Jhaveri et al. | |
| 7,516,451 B2 | 4/2009 | Peng | |
| 7,529,780 B1 | 5/2009 | Braginsky et al. | |
| 7,530,065 B1 | 5/2009 | Ciudad et al. | |
| 7,555,750 B1 | 6/2009 | Lilley | |
| 7,596,720 B2 | 9/2009 | Curtis et al. | |
| 7,603,447 B2 | 10/2009 | Hodgson | |
| 7,657,886 B1 | 2/2010 | Chen et al. | |
| 7,669,197 B1 | 2/2010 | O'Neill et al. | |
| 7,676,792 B2 | 3/2010 | Irie et al. | |
| 7,698,698 B2 | 4/2010 | Skan | |
| 7,747,567 B2 | 6/2010 | Teegan et al. | |
| 7,752,626 B1 | 7/2010 | Pandey et al. | |
| 7,788,662 B2 | 8/2010 | Haselden et al. | |
| 7,797,695 B2 | 9/2010 | Motta | |
| 7,840,957 B2 | 11/2010 | Kumashiro et al. | |
| 7,844,964 B2 | 11/2010 | Marolia | |
| 7,870,412 B2 | 1/2011 | Maes | |
| 7,958,502 B2 | 6/2011 | Motta et al. | |
| 7,971,199 B1 | 6/2011 | Chen | |
| 7,974,613 B1 | 7/2011 | Shanker et al. | |
| 7,987,449 B1 | 7/2011 | Marolia et al. | |
| 8,245,218 B2 | 8/2012 | Giambalvo et al. | |
| 8,311,981 B2 | 11/2012 | Braginsky et al. | |
| 8,316,224 B2 | 11/2012 | Vidal et al. | |
| 8,340,635 B2 | 12/2012 | Herz et al. | |
| 8,443,361 B2 | 5/2013 | Vidal et al. | |
| 8,495,621 B2 | 7/2013 | Traut et al. | |
| 8,522,232 B1 | 8/2013 | Carter et al. | |
| 8,555,273 B1 | 10/2013 | Chia et al. | |
| 8,595,715 B2 | 11/2013 | Ward et al. | |
| 8,612,398 B2 | 12/2013 | Jarrett et al. | |
| 8,612,516 B2 | 12/2013 | Mallur et al. | |
| 8,612,961 B2 | 12/2013 | Stewart | |
| 8,620,272 B2 | 12/2013 | Ganatra et al. | |
| 8,626,146 B2 | 1/2014 | Koganti et al. | |
| 8,635,608 B2 | 1/2014 | Ramesh et al. | |
| 8,762,977 B2 | 6/2014 | Olsson et al. | |
| 8,893,109 B2 | 11/2014 | Birtwhistle et al. | |
| 8,918,775 B1 | 12/2014 | Carpenter et al. | |
| 9,092,286 B2 * | 7/2015 | Sprigg | G06F 8/60 |
| 9,134,989 B2 * | 9/2015 | Minear | G06F 8/65 |
| 2001/0029178 A1 | 10/2001 | Criss et al. | |
| 2001/0029605 A1 * | 10/2001 | Forbes | G06F 8/61 717/170 |
| 2001/0048728 A1 | 12/2001 | Peng | |
| 2001/0052052 A1 | 12/2001 | Peng | |
| 2001/0053688 A1 | 12/2001 | Rignell et al. | |
| 2002/0016956 A1 | 2/2002 | Fawcett | |
| 2002/0077094 A1 | 6/2002 | Leppanen | |
| 2002/0078209 A1 | 6/2002 | Peng | |
| 2002/0091799 A1 | 7/2002 | Katz et al. | |
| 2002/0100035 A1 | 7/2002 | Kenyon et al. | |
| 2002/0131404 A1 | 9/2002 | Mehta et al. | |
| 2002/0144254 A1 * | 10/2002 | Owada | G06F 8/68 717/171 |
| 2002/0157090 A1 | 10/2002 | Anton, Jr. | |
| 2002/0177437 A1 | 11/2002 | Chesavage et al. | |
| 2002/0178178 A1 * | 11/2002 | Peng | G06F 17/30902 |
| 2002/0194578 A1 * | 12/2002 | Irie | G06F 8/36 717/122 |
| 2003/0014744 A1 * | 1/2003 | Doll | G06F 8/65 717/170 |
| 2003/0023516 A1 | 1/2003 | Sharrow et al. | |
| 2003/0046676 A1 | 3/2003 | Cheng et al. | |
| 2003/0066065 A1 * | 4/2003 | Larkin | G06F 8/65 717/177 |
| 2003/0078036 A1 | 4/2003 | Chang et al. | |
| 2003/0084434 A1 * | 5/2003 | Ren | 717/172 |
| 2003/0100297 A1 | 5/2003 | Riordan et al. | |
| 2003/0105847 A1 | 6/2003 | Jennery et al. | |

(56) References Cited

U.S. PATENT DOCUMENTS

| | | | |
|---|---|---|---|
| 2003/0110484 A1* | 6/2003 | Famolari | G06F 8/65 717/173 |
| 2003/0124974 A1 | 7/2003 | Asami | |
| 2003/0143991 A1* | 7/2003 | Minear | G06F 8/65 455/419 |
| 2003/0145315 A1 | 7/2003 | Aro et al. | |
| 2004/0002943 A1* | 1/2004 | Merrill | H04L 41/0893 |
| 2004/0003266 A1 | 1/2004 | Moshir et al. | |
| 2004/0003389 A1* | 1/2004 | Reynar | G06F 8/65 717/178 |
| 2004/0006630 A1 | 1/2004 | Friend et al. | |
| 2004/0015953 A1* | 1/2004 | Vincent | G06F 8/65 717/173 |
| 2004/0024795 A1 | 2/2004 | Hind et al. | |
| 2004/0031029 A1* | 2/2004 | Lee | G06F 8/65 717/171 |
| 2004/0034850 A1* | 2/2004 | Burkhardt | G06F 8/65 717/120 |
| 2004/0038675 A1 | 2/2004 | Criss et al. | |
| 2004/0068724 A1* | 4/2004 | Gardner, III | G06F 8/65 717/173 |
| 2004/0107417 A1 | 6/2004 | Chia et al. | |
| 2004/0117785 A1 | 6/2004 | Kincaid | |
| 2004/0142661 A1* | 7/2004 | Lane et al. | 455/41.2 |
| 2004/0158817 A1 | 8/2004 | Okachi et al. | |
| 2004/0181790 A1 | 9/2004 | Herrick | |
| 2004/0188510 A1 | 9/2004 | Sprigg et al. | |
| 2004/0188511 A1 | 9/2004 | Sprigg et al. | |
| 2004/0205745 A1 | 10/2004 | Piazza | |
| 2004/0215755 A1* | 10/2004 | O'Neill | G06F 8/65 709/223 |
| 2004/0224674 A1 | 11/2004 | O'Farrell et al. | |
| 2004/0230965 A1 | 11/2004 | Okkonen | |
| 2005/0044235 A1 | 2/2005 | Balahura et al. | |
| 2005/0132357 A1 | 6/2005 | Shell et al. | |
| 2005/0268296 A1 | 12/2005 | Marolia et al. | |
| 2006/0031262 A1 | 2/2006 | Satoh et al. | |
| 2006/0206888 A1 | 9/2006 | Mavrinac et al. | |
| 2006/0277408 A1 | 12/2006 | Bhat et al. | |
| 2007/0006222 A1 | 1/2007 | Maier et al. | |
| 2007/0074203 A1 | 3/2007 | Curtis et al. | |
| 2007/0169073 A1 | 7/2007 | O'Neill et al. | |
| 2007/0169093 A1 | 7/2007 | Logan et al. | |
| 2007/0293212 A1 | 12/2007 | Quon et al. | |
| 2008/0003991 A1 | 1/2008 | Sievers et al. | |
| 2008/0028385 A1 | 1/2008 | Brown et al. | |
| 2008/0148250 A1 | 6/2008 | Motta | |
| 2008/0270481 A1 | 10/2008 | Augustine | |
| 2008/0270485 A1 | 10/2008 | Yu et al. | |
| 2008/0281828 A1 | 11/2008 | Swartz et al. | |
| 2009/0077263 A1 | 3/2009 | Koganti et al. | |
| 2010/0242034 A1 | 9/2010 | Rugh et al. | |
| 2011/0078675 A1 | 3/2011 | Van Camp et al. | |
| 2011/0252415 A1 | 10/2011 | Ricci | |
| 2012/0180037 A1 | 7/2012 | McCaleb et al. | |
| 2013/0047145 A1 | 2/2013 | Cui | |
| 2013/0139139 A1 | 5/2013 | Mallur et al. | |
| 2013/0198732 A1 | 8/2013 | Fujita | |
| 2013/0326493 A1 | 12/2013 | Poonamalli et al. | |
| 2014/0053145 A1 | 2/2014 | Steigleder | |
| 2014/0128054 A1 | 5/2014 | Koganti et al. | |
| 2014/0130035 A1 | 5/2014 | Desai et al. | |
| 2014/0208306 A1 | 7/2014 | Halder et al. | |

FOREIGN PATENT DOCUMENTS

| | | | | |
|---|---|---|---|---|
| DE | 19543843 A1 | 5/1997 | | |
| EP | 0841615 A2 | 5/1998 | | |
| EP | 0959635 A1 | 11/1999 | | |
| EP | 1672545 A1 | 6/2006 | | |
| GB | 2348721 | 10/2000 | | |
| JP | 1198477 | 8/1989 | | |
| JP | 5210507 A | 8/1993 | | |
| JP | 08106393 | 4/1996 | | |
| JP | 9292980 A | 11/1997 | | |
| JP | 10021061 A | 1/1998 | | |
| JP | 10049354 A | 2/1998 | | |
| JP | 11110197 A | 4/1999 | | |
| JP | 11225359 A | 8/1999 | | |
| JP | H11331937 A | 11/1999 | | |
| JP | H11514760 A | 12/1999 | | |
| JP | 2000132355 | 5/2000 | | |
| JP | 2000132397 A | 5/2000 | | |
| JP | 2000276335 A | 10/2000 | | |
| JP | 2001043073 A | 2/2001 | | |
| JP | 2001053882 A | 2/2001 | | |
| JP | 2001101219 A | 4/2001 | | |
| JP | 2001251380 A | 9/2001 | | |
| JP | 2001256053 A | 9/2001 | | |
| JP | 2001296994 A | 10/2001 | | |
| JP | 2001337832 A | 12/2001 | | |
| JP | 2001356912 A | 12/2001 | | |
| JP | 2002215692 A | 8/2002 | | |
| JP | 2002278767 A | 9/2002 | | |
| JP | 2005174048 A | 6/2005 | | |
| JP | 2008536344 A | 9/2008 | | |
| JP | 2009134589 A | 6/2009 | | |
| JP | 2012091840 A | 5/2012 | | |
| KR | 19990057991 | 7/1999 | | |
| KR | 1020020009741 | 2/2002 | | |
| KR | 20030030044 A | 4/2003 | | |
| KR | 20030033396 A | 5/2003 | | |
| RU | 2233033 C2 | 7/2004 | | |
| TW | 361057 | 6/1999 | | |
| TW | 448404 B | 8/2001 | | |
| TW | 473660 B | 1/2002 | | |
| TW | 503368 B | 9/2002 | | |
| WO | 9102313 A1 | 2/1991 | | |
| WO | 9729606 A1 | 8/1997 | | |
| WO | 9838820 A2 | 9/1998 | | |
| WO | 99045465 | 9/1999 | | |
| WO | WO 99/56207 | * 11/1999 | | G06F 9/44 |
| WO | 2000035117 | 6/2000 | | |
| WO | 00077614 | 12/2000 | | |
| WO | 0169888 | 9/2001 | | |
| WO | 0193030 A1 | 12/2001 | | |
| WO | 02046914 | 6/2002 | | |
| WO | 02075525 | 9/2002 | | |
| WO | 03065168 | 8/2003 | | |
| WO | 03083667 A1 | 10/2003 | | |
| WO | 2007056954 A1 | 5/2007 | | |

OTHER PUBLICATIONS

Annosi., et al., "Managing and Assessing the Risk of Component Upgrades", 2012 IEEE, PLEASE'12, Jun. 4, 2012, pp. 9-12.

Baggiolini et al., "Toward Automatic, Run-time Fault Management for Component-Based Applications", 1998 Springer, pp. 1-5.

Castro P., et al., "Before-Commit Client State Management Services for AJAX Applications", Hot Topics in Web Systems and Technologies, 2006. HOTWEB '06. 1st IEEE Workshop on, IEEE, PI , Nov. 1, 2006 (Nov. 1, 2006), pp. 1-12, XP031082790, ISBN: 978-1-4244-0595-4, abstract sections I., II.C, II.D, III., IV.F, IV.G, V.C, V.D, VII.

Dolgolaptev, V.G., "Rabota v Windows 95 na primerakh", (Operation in Windows 95 by Examples)—Moscow, Vostochnaya Knizhnaya Kompania (East Book Company), published on 1997, 464 pp.

Grundy et al., "Engineering Plug-In SW Components to Support Collaborative Work", Software—Practice and Experience, 2002, vol. 32, Wiley, pp. 938-1013.

Gu., et al., "Low-disruptive Dynamic Updating of Java Applications", 2014 Elsevier, vol. 56, Issue 9, Sep. 2014, pp. 1086-1098.

Gui N.,et al., "A Framework for Adaptive Real-Time Applications: the Declarative Real-Time OSGi Component Model", ACM, ARM, Leuven, Belgium,Dec. 1, 2008,. pp. 35-40.

International Search Report—PCT/US03/040926, International Search Authority, European Patent Office, dated Sep. 2, 2008.

La Manna V.P, "Dynamic Software Update for Component-based Distributed Systems", Jun. 2011, Boulder, Colorado, USA, pp. 1-8.

(56) References Cited

OTHER PUBLICATIONS

Lucredio D., et al., "Orion—A Component-Based Software Engineering Environment", Journal of Object Technology, vol. 3, No. 4,, Apr. 2004, pp. 51-74.

Mesbah A., et al., "An Architectural Style for Ajax", Software Architecture, 2007, WICSA '07. The Working IEEE/IFIP Conference on Jan. 1, 2007 (Jan. 1, 2007), pp. 1-10, XP031013840 ISBN: 978-0-7695-2744-4, abstract sections 2.2, 4.2, 4.3, 4.4.

Nguyen T N., "Component-based Software Update Process in Collaborative Software Development", 2008 IEEE, APSEC'08, Dec. 3-5, 2008, pp. 437-444.

OMA "SyncML Meta Information," Approved version 1.2—Feb. 21, 2007, Open Mobile Alliance, OMA-TS-SyncML_MetaInfo-V1_2-20070221-A, pp. 1-25.

OMA "SyncML OBEX Binding," Approved version 1.2—Feb. 21, 2007, Open Mobile Alliance, OMA-TS-SyncML_OBEXBinding-V1_2-20070221-A, pp. 1-30.

OMA "SyncML Representation Protocol," Approved version 1.2—Feb. 21, 2007, Open Mobile Alliance, OMA-SyncML-RepPro-V1_2-20070221-A, pp. 1-60.

OMA "SyncML Server Alerted Notification," Approved version 1.2—Feb. 21, 2007, Open Mobile Alliance, OMA-TS-SyncML_SAN-V1_2-20070221-A, pp. 1-17.

OMA "SyncML WSPBinding," Approved version 1.2—Feb. 21, 2007, Open Mobile Alliance, OMA-TS-SyncML_WSPBinding-V1_2-20070221-A, pp. 1-17.

Open Mobile Alliance, "DS Protocol Approved Version 1.2 OMA-TS-DS_Protocol-V1_2-2-20060710-A", Internet Citation, [Online] Jul. 10, 2006 (Jul. 10, 2006), XP002456758 Retrieved from the Internet: [retrieved on Oct. 26, 2007] sections 5., 6.12, 9.

Supplementary European Search Report—EP03800088, Search Authority—Munich Patent Office, dated May 13, 2009.

SyncML Representation Protocol, Version 1.0.1, [retrieved on Jun. 15, 2001], 105 Pages, Retrieved from the Internet: URL: http://www.syncml.org/docs/syncml_represent_v101_20010615.pdf.

Taiwanese Search Report—092136239—TIPO—dated Dec. 15, 2009.

Tijs Van Der Storm., "Continuous Release and Upgrade of Component-Based Software", 2005 ACM, Sep. 5, 2005, SCM'05, pp. 43-57, http://dl.acm.org/results.cfm?h=1&cfid=603384239&cftoken=64589296.

Tromcek Z., "Semi-Automatic Component Upgrade with RefactoringNG", 2011 IEEE, pp. 907 910, http://ieeexplore.ieee.org/stamp/stamp.jsp?tp=&arnumber=6078310.

Written Opinion—PCT/US03/040926, IPEA/US—dated Oct. 9, 2008.

Yang X., et al., "A Component-based Software Framework for Product Lifecycle Information Management for Consumer Products",Consumer Electronics, IEEE Transactions on , May 2007, pp. 1195-1203.

* cited by examiner

SYSTEM TO AUTOMATICALLY PROCESS COMPONENTS ON A DEVICE

CLAIM OF PRIORITY 35 U.S.C. § 119

The present Application for Patent is a Continuation of Non-Provisional application Ser. No. 10/740,355, entitled "SYSTEM TO AUTOMATICALLY PROCESS COMPONENTS ON A DEVICE", filed Dec. 18, 2003, which in turn claims priority to U.S. Provisional Patent Application having Application No. 60/435,486, entitled "AUTO-INSTALL", filed on Dec. 20, 2002, and also to U.S. Provisional Patent Application No. 60/435,828, entitled "REGISTRY-BASED AUTO INSTALL COMPONENT HANDLING", filed on Dec. 20, 2002, each of which is incorporated by reference in its entirety.

BACKGROUND

I. Field

The present invention relates generally to the processing of components on a device, and more particularly, to a system for automatically installing, updating, or removing components on a device.

II. Description of the Related Art

Data networks provide a way for a large numbers of users to communicate with each other using a variety of network-enabled devices. For example, in a wireless communication network, a variety of network-enabled portable telephones allow users to communicate with each other over great distances. The network-enabled devices are generally configured with a variety of installed components that control how the device operates, and ultimately, how well the overall network performs.

In certain circumstances a network operator would like to upgrade, install, delete, or otherwise change the configuration of the network-enabled devices. For example, as system software is improved, the network operator would like to have new components installed on all devices in the network so that the network operates more efficiently. For example, the network operator may like to install application software, a binary executable, or other information on the devices to provide service improvements or upgrades. In another situation, the network operator may desire to install enterprise applications or other device upgrade applications based on the needs of a specific type of device. Furthermore, if it is determined that a problem exists with a currently installed system component, the network operator would like to install an upgraded component to repair the problem, regardless of whether the device user is even aware that the problem exists. For example, if a problem exists with a current device component that allows a user to view multimedia content, the network operator would like to upgrade all the devices on the network to replace this component with a new component that does not have the problem.

One technique used to install, upgrade, delete, or otherwise change the components on a device is to wait for the device user to return the device to a repair center. Once at the repair center, repair personnel can reprogram the device so that the device has the most recent component versions. Unfortunately, this process is very inefficient because device users may fail to return the device if they are unaware of the problem, or if the problem is not currently affecting how they used the device. Because not all of the devices will be upgraded, some devices will not operate to provide the best performance and the overall operation of the network may be degraded.

Therefore, what is needed is a system to automatically process components on a device to allow selected versions of components to be installed and activated. The system should be flexible enough to process the components on a large number of devices in a relatively short time, thereby providing fast upgrades to all devices operating on a network, which will result in the best device performance and increased network efficiency.

SUMMARY

In one or more embodiments, a system is provided to automatically process components on a device. For example, in one embodiment, the system allows a device to install, update, delete, activate, disable, recall or otherwise change the state of a component on a device using a versioned action list available on a download server. The components that can be processed may be of any type, for example, an application, executable, configuration information, user interface settings, random data, or any other type of information.

During operation of the system, the device checks the version of the action list on the download server against a stored version associated with the last action list processed by the device. If the two versions are different, the device downloads the new action list from the server and parses each item in the action list to process components on the device. In one embodiment, each item in the action list comprises a component/action pair that associates a component identifier with an action identifier. The component identifier identifies a type of component and its current version. The action identifier identifies an action to be performed by the device with respect to the identified component.

In one embodiment, the device parses each component/action pair in the action list to determine whether an action needs to be performed for the identified component. The device compares the version of the component in the action list to a component version stored on the device. If the two component versions are the same, the device takes no action with regards to that component/action pair. If the versions are different, the device performs the action associated with the component in the action list. For example, if the action is to install the identified component, the device downloads the component, and any other necessary information from the download server, and installs the component on the device. Thus, the device steps through the action list performing the designated actions only on new component versions.

After processing a particular component/action pair, the component version stored on the device is updated with the new component version provided in the action list. When the entire action list has been processed, the device records the version identifier of the action list, so as to avoid re-processing the current action list in the future. Thus, the device will not process another action list until the version of the action list available on the download server is different from the stored version on the device.

In one embodiment, the device checks the version of the action list every time the device communicates with the download server. For example, the device may communicate with the download server after the device is powered on or at periodic intervals. The system provides a mechanism to allow components to be processed on the device with no user interaction or limited user interaction. For example, in one embodiment, components may be pushed to a device at power up to effectively provide a "silent installation." In another embodiment, a user interface is provided so that the component processing may be at the option of the user. Thus, the system allows the component processing to be forced, prompted, required, or optional.

The system may be used to process components on a single device or on a large number of devices. For example, in a data network where are large number of devices can access an action list server, a single action list can be delivered to all devices and each device can determine what components to process for that device. In another embodiment, the server may provide multiple action lists that can be used for different device types. For example, different types of devices may access a different action list to process components for that type of device. Thus, it is possible for the system to provide global updates to a large number of devices, where the updates are performed over a period of hours or days as each device contacts the action list server. Additionally, communication between the server and a device can be performed using any type of secure communication technique, such as encryption or any type of encoding, so that the devices can be authenticated and any transmission of information is done in a secure fashion.

In one embodiment, a method is provided for automatically processing components on a device. The method comprises receiving a version identifier associated with an action list, determining that the version identifier is not equivalent to a stored version identifier, receiving the action list, parsing the action list to obtain a component identifier and an associated action, and performing the action on a component identified by the component identifier.

In one embodiment, apparatus is provided for automatically processing components on a device. The apparatus comprises logic to receive a version identifier associated with an action list, and logic to compare the version identifier to a stored version identifier. The apparatus also comprises logic to receive the action list if the version identifier is not equivalent to the stored version identifier, and logic to parse the action list to obtain a component identifier and an associated action. The apparatus also comprises logic to perform the action on a component identified by the component identifier.

In one embodiment, apparatus is provided for automatically processing components on a device. The apparatus comprises means for receiving a version identifier associated with an action list, and means for determining that the version identifier is not equivalent to a stored version identifier. The apparatus also comprises means for receiving the action list, and means for parsing the action list to obtain a component identifier and an associated action. The apparatus also comprises means for performing the action on a component identified by the component identifier.

In one embodiment, a computer-readable media is provided comprising instructions, which when executed by processing logic in a device, operate to automatically process components on the device. The computer-readable media comprises instructions for receiving a version identifier associated with an action list, and instructions for determining that the version identifier is not equivalent to a stored version identifier. The computer-readable media also comprises instructions for receiving the action list, and instructions for parsing the action list to obtain a component identifier and an associated action. The computer-readable media also comprises instructions for performing the action on a component identified by the component identifier.

Other aspects, advantages, and features of the present invention will become apparent after review of the hereinafter set forth Brief Description of the Drawings, Detailed Description of the Invention, and the Claims.

BRIEF DESCRIPTION OF THE DRAWINGS

The foregoing aspects and the attendant advantages of the embodiments described herein will become more readily apparent by reference to the following detailed description when taken in conjunction with the accompanying drawings wherein.

DETAILED DESCRIPTION

The following detailed description describes embodiments of a system to automatically process components on a device. The system is suitable for use in any type of wired or wireless network, including but not limited to, communication networks, public networks, such as the Internet, private networks, such as virtual private networks (VPN), local area networks, wide area networks, long haul network, or any other type of data network. The system is also suitable for use with any type of device that is capable of downloading and installing components. For example, the system is suitable for use with office computers, notebook computers, and handheld devices, such as portable telephones, PDAs, or any other type of device capable of receiving and installing components.

In one or more embodiments, the system interacts with a runtime environment executing on the device that is used to simplify operation of the device, such as by providing generalized calls for device specific resources. One such runtime environment is the Binary Runtime Environment for Wireless™ (BREW™) software platform developed by QUALCOMM, Inc., of San Diego, Calif. In the following description, it will be assumed that the device is executing a runtime environment, such as the BREW software platform. However, one or more embodiments of the system are suitable for use with other types of runtime environments to automatically process components on a variety of wired and wireless devices.

Figure 1:
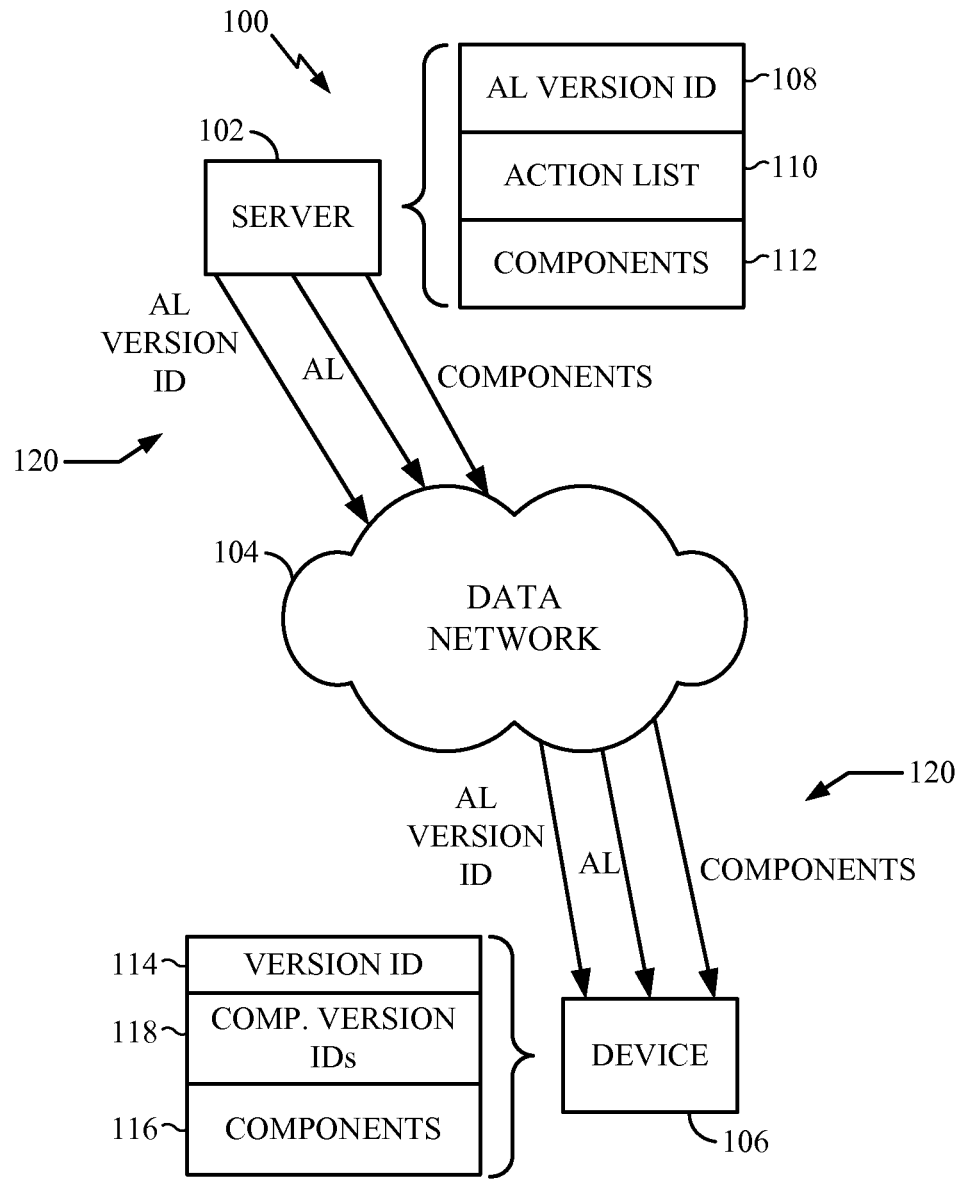
FIG. 1 shows one embodiment of a system to automatically process components on a device.

FIG. 1 shows one embodiment of a system 100 to automatically process components on a device. The system 100 comprises a server 102, a data network 104, and a device 106. The data network 104 may be any type of wired or wireless network that allows information to be communicated between the server 102 and the device 106. For example, the network 104 may be a communication network, wide area network, virtual private network, or a public network, such as the Internet.

In one or more embodiments, the system operates to process components on the device 106. For example, the server 102 includes components 112, an action list 110, and an action list version identifier 108. The version identifier 108 identifies the current version of the action list 110. The action list 110 comprises component/action pairs where each pair comprises a component identifier and an action identifier. The component identifier is a unique item ID that identifies a particular component. A portion of the component identifier is used to identify a version of the component. For example, the component identifier is a series of bits where a portion of the bits is used to identify the version of the component. The action identifier identifies a particular action, such as install, update, delete, recall, disable, or any other action that the device 106 will perform with regards to the identified component.

During operation, the server 102 transmits the action list version identifier 108 to the device 106 via the network 104. For example, the device 106 may contact the server 102 during a power up sequence and the server 102 responds by transmitting the action list version identifier 108 to the device 106. The device 106 compares the version identifier 108 with a stored version identifier 114 that represents the version of the last action list to be processed by the device 106. If the downloaded version 108 and the stored version 114 are equivalent, then the device does not need to perform any installations or changes to the existing components 116 on the device. However, if the downloaded version 108 is different from the stored version 114, then the device 106 knows that additional component processing is required. For example, there may be new components located at the server 102 that need to be installed on the device 106.

Once the device 106 detects that a new version of the action list exists, it transmits a request to the server 102 to obtain the new action list 110. The server 102 responds by transmitting the action list 110 to the device 106. The device 106 then processes the action list 110 to install, update, delete or otherwise process components identified in the action list 110.

The device 106 operates to process the action list 110 by stepping through each component/action pair and determining whether or not to take action with regard to each component. For example, if the action list specifies that a component needs to be installed or updated, the device 106 downloads the component 112 and any other required files from the server 102 and installs it on the device 106. For example, information from the server 102 transmitted to the device 106 is shown generally at 120. If the action list 110 specifies that a component needs to be deleted, the device 106 deletes the component. Thus, each component/action pair in the action list 110 is processed by the device 106 to automatically install, update, delete, etc., the identified component. The action list may be of any length and after processing the action list, the device 106 updates the stored action list version identifier 114 to store the version of the most recently processed action list (i.e., version 108).

In one embodiment, the device 106 parses the component/action pairs in the action list 110 to determine whether or not action related to a particular component needs to be taken. For example, the device 106 may already have the newest version of a component installed, and so it is not necessary for the device to re-install that component. In one embodiment, the component identifier in the action list 110 includes information to determine the version of the component. For example, the version information can be appended to the end of the component identifier. The device 106 compares a stored component version 118 to the component version downloaded in the action list 110. If the stored and downloaded component versions are the same, then the device need not take any action with regards to that component. However, if the stored and downloaded component versions are different, then the device 106 performs the action associated with that component in the action list. Thus, the system is very efficient, since the device 106 only processes new versions of the components.

Figure 2:
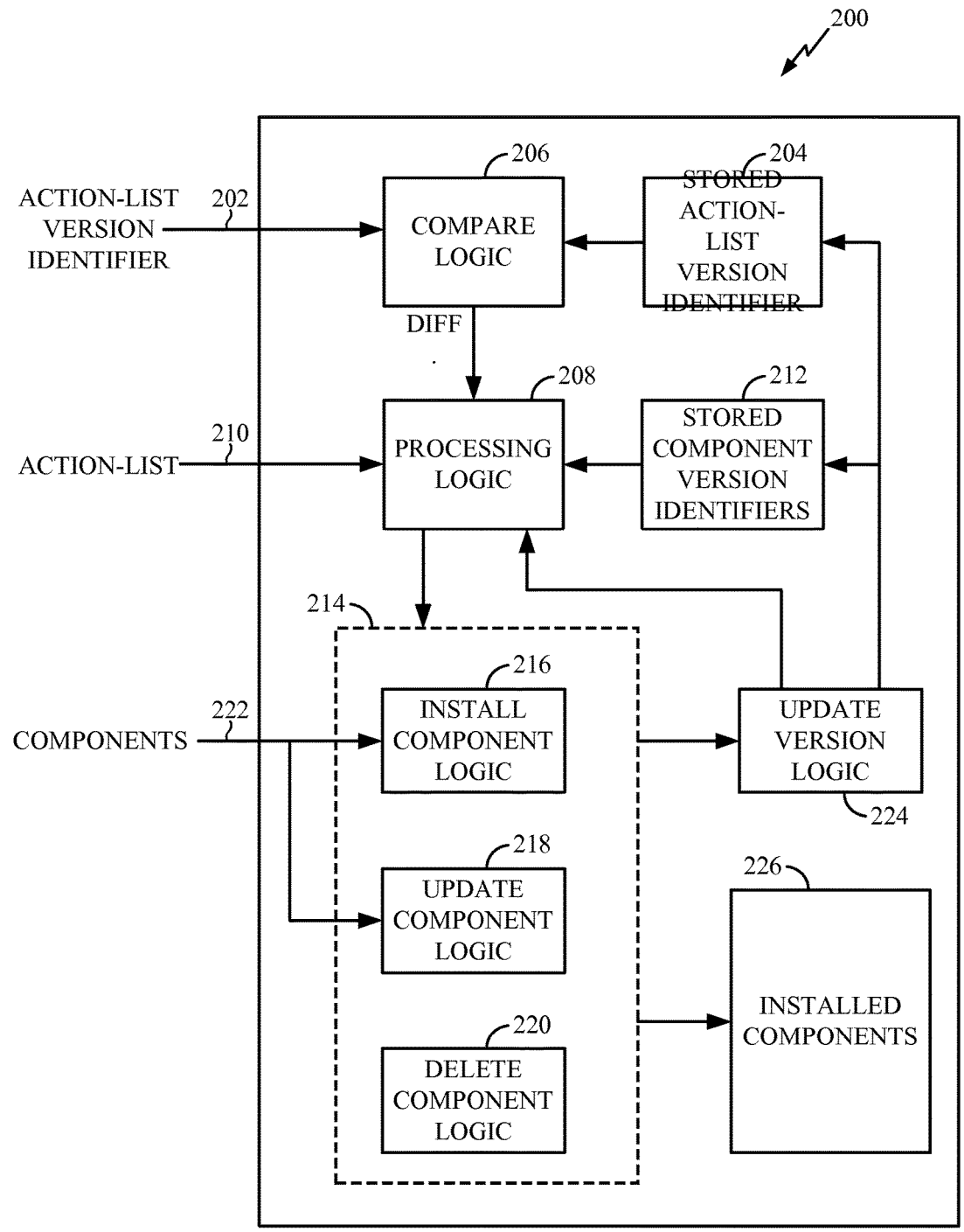
FIG. 2 shows a functional diagram of a device that includes one embodiment of a system to automatically process components.

FIG. 2 shows a functional diagram of a device 200 that includes one embodiment of a system to automatically process components on the device 200. The device comprises processing logic 208, compare logic 206, function logic 214, version update logic 224, a stored action list version identifier 204, component version identifiers 212, and installed components 226. The described logic and functions provided by the device 200 may be implemented in hardware, software, or a combination of hardware and software. For example, in one or more embodiments, the processing logic 208 comprises a CPU, processor, gate array, hardware logic, memory elements, virtual machine, software, and/or any combination of hardware and software. Thus, the processing logic 208 generally comprises logic to execute machine-readable instructions to perform the functions described herein. It should be noted that the device 200 illustrates just one embodiment and that changes, additions, or rearrangements of the device elements may be made without deviating from the scope of the invention.

Figure 3:
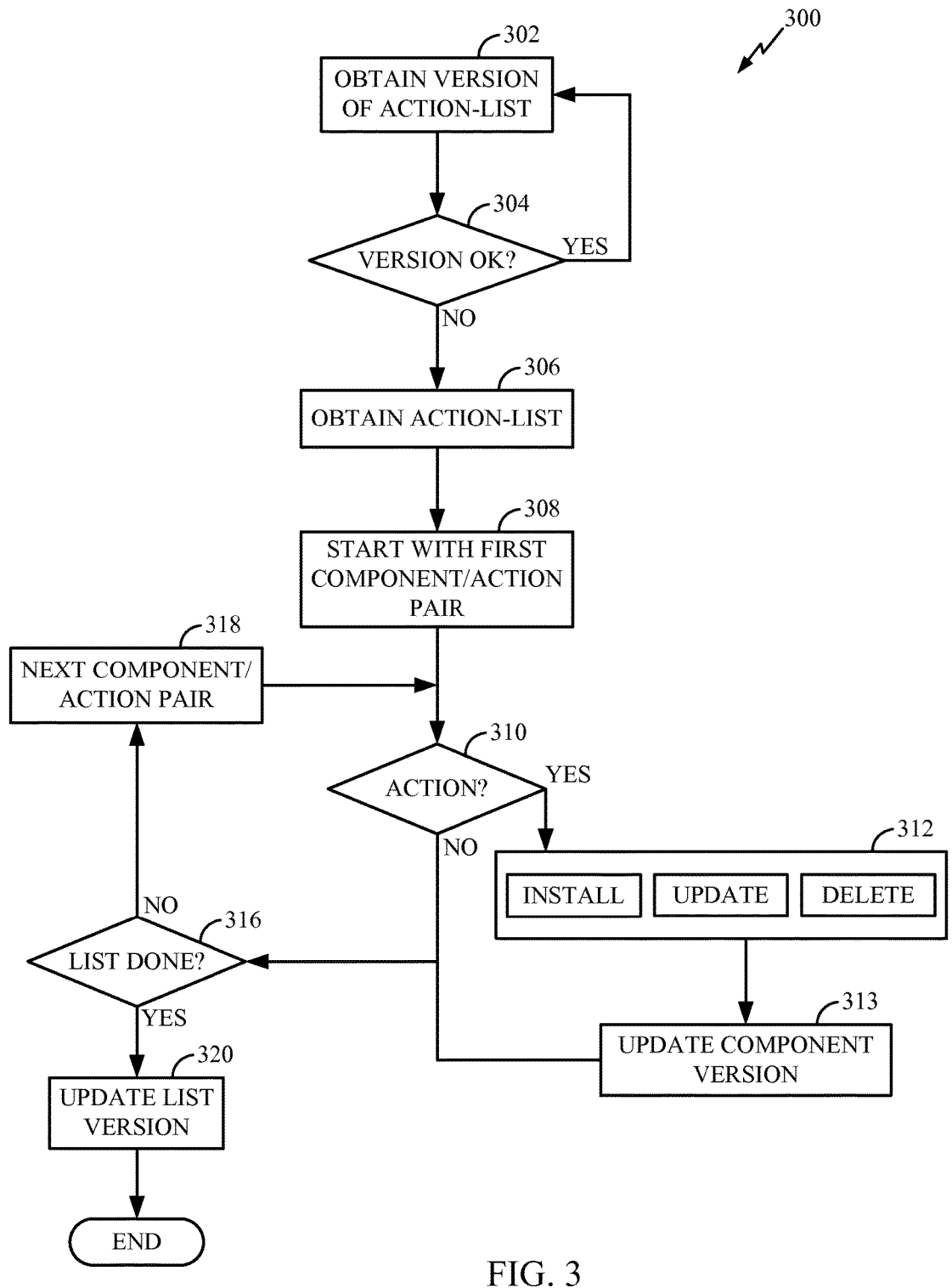
FIG. 3 shows one embodiment of a method for operating a device to provide a system to automatically process components on the device.

FIG. 3 shows one embodiment of a method 300 for operating a device, such as device 200, to provide a system to automatically process components on the device 200. For the purposes of clarity, the method 300 will be described with reference to the device 200 shown in FIG. 2. It will further be assumed that the device 200 is in secure communication with a download server via a data network, as illustrated in FIG. 1.

At block 302, the device obtains an action list version identifier from the download server. For example, the device communicates with the download server via a data network and the download server transmits the action list version identifier to the device, as shown at 202.

At block 304, a test is performed to determine if the downloaded action list version identifier is different from a stored version identifier that is associated with the last action list to be processed by the device. For example, the downloaded version identifier 202 and the stored version identifier 204 are input to compare logic 206 that compares the two identifiers to determine if they are equivalent. If the two version identifiers are equivalent, the method returns to block 302 to obtain a new version of the action list at another time. If the two version identifiers are different (Diff), the method proceeds to block 306.

At block 306, the device retrieves the action list from the download server. For example, the action list 210 is downloaded from the server to the processing logic 208 via the data network.

At block 308, the device begins processing the action list by parsing the first component/action pair in the action list. For example, the processing logic 208 operates to process the downloaded action list 210 to parse the component/action pairs.

At block 310, a test is performed to determine what action, if any, is required for the component/action pair that is currently being processed. In one embodiment, the device operates to automatically perform the action by proceeding to block 312. However, this may result in existing components being re-installed on the device. In another embodiment, the version of the component is checked to determine if the action is necessary. For example, if the action is to "install" the component, the version of the component is checked to see if the device has that version of the component currently installed. Thus, the method operates to avoid re-installing components that are already installed on the device. For example, the processing logic 208 retrieves a stored component version identifier 212 and compares it to the version of the component identified in the action list. In one embodiment, the version of the component is incorporated in the component identifier provided in the action list. If the two component versions are the same, no further action is required with regards to that component and the method proceeds to block 416. If the two component versions are different, then the processing logic 208 operates to perform the action associated with the component and the method proceeds to block 312.

At block 312, the action associated with the component in the current component/action pair is performed to change the state of the identified component. For example, the processing logic 208 operates to control the action logic 214 to perform the action of installing, updating, deleting, activating, disabling, recalling or otherwise changing the state of the identified component. For example, a soft recall may be performed where the component is deleted from the device but associated data and/or licensing information is not removed. For example, if the action is to install or update the component, the processing logic 208 operates to download the component 222 (or update) from the download server via the data network. The downloaded component is then installed as an installed component 226. The processing logic 208 may perform any type of installation or update procedure to install or update the downloaded component 222 as an installed component 226. If the action is to delete a component, the processing logic 208 controls the delete logic 220 to delete the identified component from the installed components 226. Although not shown in FIGS. 2 and 3, virtually any type of action may be performed with regards to the component, such as installing, updating, deleting, recalling, activating, and deactivating, etc.

At block 314, a component version list is updated to reflect that a new version of the component has been installed or updated, or that the component has been deleted. For example, the processing logic 208 controls the version update logic 224 to update the stored component version identifiers 212 with the new information about the currently processed component.

At block 316, a test is performed to determine if all of the component/action pairs in the action list have been processed. If all pairs have been processed, the method proceeds to block 320. If all pairs have not been processed, the method proceeds to block 318 where the next pair is accessed for processing at block 310. The action list 210 may be any length and so there may exist any number of component/action pairs to be processed.

At block 320, the stored action list version identifier at the device is updated. For example, the processing logic 208 controls the update version logic 224 to update the stored action list version identifier 204 with the identifier associated with the most recently processed action list. Thus, the system will not operate to process another action list until a new version of the action list is available.

In one embodiment, the system for automatically processing components on the device comprises program instructions stored on a computer-readable media, which when executed by the processing logic 208, provides the functions described herein. For example, instructions may be loaded into the device 200 from a computer-readable media, such as a floppy disk, CDROM, memory card, FLASH memory device, RAM, ROM, or any other type of memory device or computer-readable media that interfaces to the device 200. In another embodiment, the instructions may be downloaded into the device 200 from a network resource that interfaces to the device 200 via a data network. The instructions, when executed by the processing logic 208, provide one or more embodiments of a system for automatically processing components on the device as described herein.

It should be noted that the method 300 illustrates just one embodiment and that changes, additions, or rearrangements of the method elements may be made without deviating from the scope of the invention.

Figure 4:
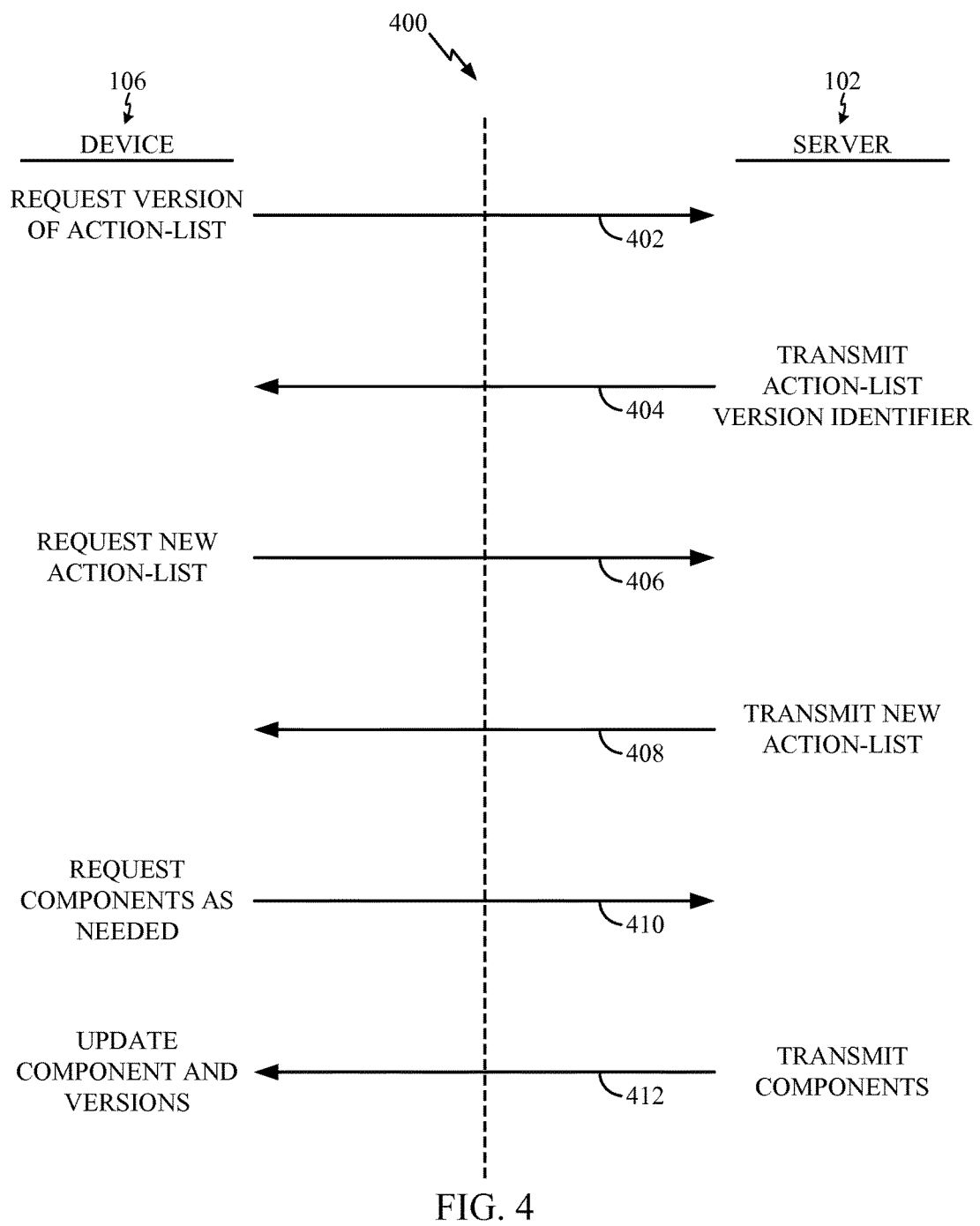
FIG. 4 shows transactions that occur between a download server and a device during operation of one embodiment of a system to automatically process components on the device.

FIG. 4 shows transactions 400 that occur between a download server and a device during operation of one embodiment of a system to automatically process components on the device. For example, the transaction 400 may occur between the device 106 and the server 102 shown in FIG. 1.

At the start of the automatic process, the device 106 requests the latest version identifier of an action list from the server 102, as shown at 402. The action list comprises component/action pairs that describe an action the device should perform with respect to each identified component. The action list may be changed or updated periodically and the action list version identifier identifies the current version of the action list.

The server 102 responds to the request from the device 102 by transmitting the version identifier of the current action list, as shown at 404. After receiving the action list version identifier, the device compares that identifier with a stored action list version identifier. If the two version identifiers are equivalent, then the device takes no further action. If the two version identifiers are different, then the device 102 requests a new action list from the server 102, as shown at 406.

The server 102 responds to the request from the device 106 by transmitting the new action list, as shown at 408. The device 106 processes each component/action pair in the action list to determine whether or not to install, update, or delete a particular component. If the device 106 determines that a particular component needs to be installed or updated, the device 106 requests the component (or update) from the server 102 as shown at 410.

The server 102 responds to the request by transmitting the requested component to the device 106. The device 106 receives the component and performs the installation or update as required. The component may have a component version identifier that the device stores locally. After the device 106 parses the entire action list and retrieves all the needed components from the server 102 as necessary, the device 106 updates a locally stored action list version identifier with the version of the action list that was just processed. Thus, the device 106 will not process another action list from the server 102 until the action list version identifier downloaded from the server is different from the stored identifier.

Figure 5:
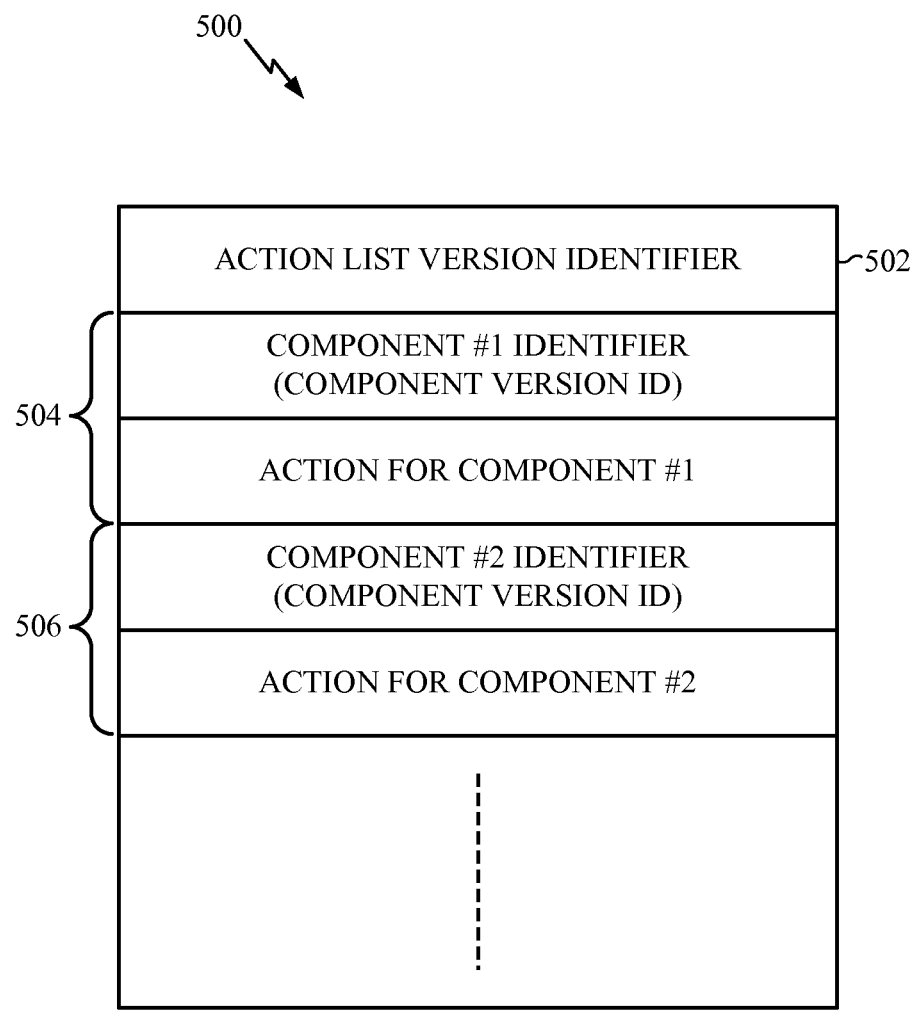
FIG. 5 shows one embodiment of an action list for use in a system to automatically process components on a device.

FIG. 5 shows one embodiment of an action list 500 for use in a system to automatically process components on a device. The action list 500 comprises an action list version identifier 502 followed by component/action pairs (504, 506). For example, component/action pair 504 comprises a component identifier and a corresponding action. In one embodiment, the component identifier also includes a component version identifier, so that the version of the component can be used to determine whether or not the component currently exists on the device. The action may be one of "install", "update", or "delete" however, any other type of action may be specified. The information in the action list may be encoded using any suitable format and the component and action identifiers may be of any type.

Accordingly, while one or more embodiments of a system to automatically process components on a device have been illustrated and described herein, it will be appreciated that various changes can be made to the embodiments without departing from their spirit or essential characteristics. Therefore, the disclosures and descriptions herein are intended to be illustrative, but not limiting, of the scope of the invention, which is set forth in the following claims.

We claim:

1. A method of operating a server, comprising:
transmitting a version identifier that identifies an action list to a target client device, wherein the action list includes a component-specific set of actions to be selectively performed for each of a plurality of different components, each of the plurality of different components being a device-executable application that is configured for execution on the target client device;
receiving a request for the action list from the target client device in response to the transmitted version identifier being different than a stored version identifier that identifies the action list maintained on the target client device; and
transmitting the action list to the target client device in response to the request;
wherein the action list is changed or updated, further comprising:
establishing a new version identifier that identifies the changed or updated action list,
transmitting the new version identifier that identifies the changed or updated action list to the target client device,
receiving a new request for the changed or updated action list from the target client device in response to the transmitted new version identifier, and
transmitting the changed or updated action list to the target client device in response to the new request.

2. The method of claim 1, wherein the component-specific set of actions includes installing or activating at least one of the plurality of different components on the target client device.

3. The method of claim 1, wherein the component-specific set of actions includes deleting, disabling or recalling at least one of the plurality of different components that is currently installed on the target client device.

4. The method of claim 1, wherein the component-specific set of actions includes updating at least one of the plurality of different components that is currently installed on the target client device.

5. The method of claim 1, wherein the target client device is a wireless device.

6. The method of claim 1, further comprising:
receiving, from the target client device, a supplemental request for at least one new component to be installed on the target client device based on the component-specific set of actions in the action list; and
transmitting the at least one new component to the target client device in response to the supplemental request.

7. The method of claim 1, further comprising:
receiving, from the target client device, a supplemental request for at least one update to an existing component that is currently installed on the target client device based on the component-specific set of actions in the action list; and
transmitting the at least one update to the existing component to the target client device in response to the supplemental request.

8. The method of claim 1, wherein the version identifier identifies a current version of the action list maintained on the server.

9. A server, comprising:
a processor coupled to a memory and an interface that is configured to:
transmit a version identifier that identifies an action list to a target client device, wherein the action list includes a component-specific set of actions to be selectively performed for each of a plurality of different components, each of the plurality of different components being a device-executable application that is configured for execution on the target client device;
receive a request for the action list from the target client device in response to the transmitted version identifier being different than a stored version identifier that identifies the action list maintained on the target client device; and
transmit the action list to the target client device in response to the request;
wherein the action list is changed or updated, wherein the processor is further configured to:
establish a new version identifier that identifies the changed or updated action list,
transmit the new version identifier that identifies the changed or updated action list to the target client device,
receive a new request for the changed or updated action list from the target client device in response to the transmitted new version identifier, and
transmit the changed or updated action list to the target client device in response to the new request.

10. The server of claim 9, wherein the component-specific set of actions includes installing or activating at least one of the plurality of different components on the target client device.

11. The server of claim 9, wherein the component-specific set of actions includes deleting, disabling or recalling at least one of the plurality of different components that is currently installed on the target client device.

12. The server of claim 9, wherein the component-specific set of actions includes updating at least one of the plurality of different components that is currently installed on the target client device.

13. The server of claim 9, wherein the target client device is a wireless device.

14. The server of claim 9, wherein the processor coupled to the interface is further configured to:
receive, from the target client device, a supplemental request for at least one new component to be installed on the target client device based on the component-specific set of actions in the action list; and
transmit the at least one new component to the target client device in response to the supplemental request.

15. The server of claim 9, wherein the processor coupled to the interface is further configured to:
receive, from the target client device, a supplemental request for at least one update to an existing component that is currently installed on the target client device based on the component-specific set of actions in the action list; and
transmit the at least one update to the existing component to the target client device in response to the supplemental request.

16. A non-transitory computer-readable medium containing instructions stored thereon, which, when executed by a server, cause the server to perform operations, the instructions comprising:

at least one instruction configured to cause the server to transmit a version identifier that identifies an action list to a target client device, wherein the action list includes a component-specific set of actions to be selectively performed for each of a plurality of different components, each of the plurality of different components being a device-executable application that is configured for execution on the target client device;

at least one instruction configured to cause the server to receive a request for the action list from the target client device in response to the transmitted version identifier being different than a stored version identifier that identifies the action list maintained on the target client device; and at least one instruction configured to cause the server to transmit the action list to the target client device in response to the request;

wherein the action list is changed or updated, further comprising:

at least one instruction configured to cause the server to establish a new version identifier that identifies the changed or updated action list, at least one instruction configured to cause the server to transmit the new version identifier that identifies the changed or updated action list to the target client device, at least one instruction configured to cause the server to receive a new request for the changed or updated action list from the target client device in response to the transmitted new version identifier, and at least one instruction configured to cause the server to transmit the changed or updated action list to the target client device in response to the new request.

17. The non-transitory computer-readable medium of claim 16, wherein the component-specific set of actions includes installing or activating at least one of the plurality of different components on the target client device.

18. The non-transitory computer-readable medium of claim 16, wherein the component-specific set of actions includes deleting, disabling or recalling at least one of the plurality of different components that is currently installed on the target client device.

19. The non-transitory computer-readable medium of claim 16, wherein the component-specific set of actions includes updating at least one of the plurality of different components that is currently installed on the target client device.

20. The non-transitory computer-readable medium of claim 16, wherein the target client device is a wireless device.

21. The non-transitory computer-readable medium of claim 16, further comprising:

at least one instruction configured to cause the server to receive, from the target client device, a supplemental request for at least one new component to be installed on the target client device based on the component-specific set of actions in the action list; and at least one instruction configured to cause the server to transmit the at least one new component to the target client device in response to the supplemental request.

22. The non-transitory computer-readable medium of claim 16, further comprising:

at least one instruction configured to cause the server to receive, from the target client device, a supplemental request for at least one update to an existing component that is currently installed on the target client device based on the component-specific set of actions in the action list; and at least one instruction configured to cause the server to transmit the at least one update to the existing component to the target client device in response to the supplemental request.

* * * * *